United States Patent [19]

Russell et al.

[11] Patent Number: 5,437,953
[45] Date of Patent: Aug. 1, 1995

[54] DYE-POLYMER TONERS FOR ELECTROPHOTOGRAPHY

[75] Inventors: Dale D. Russell; James C. Bearss, both of Boise, Id.

[73] Assignee: Hewlett-Packard Company, Palo Alto, Calif.

[21] Appl. No.: 210,208

[22] Filed: Mar. 18, 1994

[51] Int. Cl.⁶ .............................................. G03G 9/087
[52] U.S. Cl. .................................... 430/106; 430/109
[58] Field of Search ................. 430/106, 106.6, 110, 430/115

[56] References Cited

U.S. PATENT DOCUMENTS

| | | | |
|---|---|---|---|
| 3,553,133 | 1/1971 | Olson | 252/62.1 |
| 4,645,727 | 2/1987 | Ong et al. | 430/106 |
| 4,778,742 | 10/1988 | Ong et al. | 430/106 |
| 5,200,290 | 4/1993 | Ong et al. . | |
| 5,212,033 | 5/1993 | Tsubota et al. | 430/106 |
| 5,296,325 | 3/1994 | Ohtsuka et al. | 430/106 |

*Primary Examiner*—John Goodrow

[57] ABSTRACT

This invention consolidates all of the functions served by the EP toner in one macromolecule. The invention is a macromolecule of dye-polymer comprising a dye colorant copolymerized with a linking/spacing component, using well known principles of polymer chemistry. A dye/charge director component may be copolymerized with the dye colorant and the linking/spacing component simultaneously or subsequently, or it may be an intrinsic part of the dye colorant or the linking/spacing component.

12 Claims, 2 Drawing Sheets

DYE-POLYMER TONERS FOR ELECTROPHOTOGRAPHY

BACKGROUND OF THE INVENTION

1Technical Field

This invention relates generally to liquid toners of the type used in electrophotography. More specifically, the invention relates to polymeric toner particles containing dye monomers, linking/spacing components and dye/charge director components.

2. Background Art

In electrophotography, a latent image is created on the surface of a photoconducting material by selectively exposing areas of the charged surface to light. A difference in electrostatic charge density is created between the areas on the surface exposed and unexposed to light. The visible image is developed by electrostatic toners containing pigment components and thermoplastic components. The toners are selectively attracted to the photoconductor surface either exposed or unexposed to light, depending on the relative electrostatic charges of the photoconductor surface, development electrode and the toner. The photoconductor may be either positively or negatively charged, and the toner system similarly may contain negatively or positively charged particles. For laser printers, the preferred embodiment is that the photoconductor and toner have the same polarity, but different levels of charge.

In prior art electrophotographic processes the toner may be in the form of a dust, or powder, having pigment particles imbedded in a particulate resinous carrier, as described, for example in Giaimo, U.S. Pat. No. 2,786,440, issued Mar. 26, 1957. These toner particles may be fused or fixed to the surface by known means such as heat or solvent vapor, or they may be transferred to another surface to which they may similarly be fixed, to produce a permanent reproduction of the original pattern.

Generally, toners for electrophotography (EP) must perform several functions. They must provide color, including black, they must possess a fixed or at least locally stabilized charge in order to respond to the driving force of the electrical field in the development gap, and for liquid systems, toners must form a dispersion in the suspending liquid medium at least during image development. In addition, it is usually desirable for the toner be fusible to the paper (or other receiving medium) in order to obtain permanence of the transferred image.

The related art shows these functions being served by three different chemical species in EP toner systems:
1. a pigment for coloration;
2. a charge direction agent, either loosely associated via Van der Waals attractions or complexed to functional groups on the polymeric resin, (item 3, next); and
3. a polymeric resin, which in liquid toner systems provides steric stabilization of the pigment in the dispersing liquid medium, and for both dry powder and liquid toners is usually fusible to paper or other receiving hard copy.

Traditional EP toners, as described for example, in ELMASRY et al U.S. Pat. No. 4,925,766, ELMASRY, U.S. Pat. No. 4,946,753, and JONGEWAARD, U.S. Pat. No. 4,988,602, have several undesirable characteristics which the present invention resolves. Traditional toners are pigment based. This means that the colorant is present in relatively large, solid particles, on the order of approximately 0.1 to 50 μm. For dry powder systems, the particle size is toward the high end of this range, and for liquid toner systems, smaller particle sizes are achievable. The pigment particle size establishes fundamental physical limits on color quality due to light scatter, and in the case of liquid toner systems, fundamental limitations on mobility of the particle within the fluid medium, which then limits rate of deposition of the toner and EP process and printing speeds.

In Ong et al., U.S. Pat. No. 4,778,742 is described a group of polymeric anthraquinone dyes. However, these dyes are incorporated in resin particles by the prior art techniques.

Light is scattered from particles when the particle dimensions approach, on order of magnitude, the wavelength of the light. For light in the visible range, particles from about 0.3 μm and larger will scatter the visible light. This scatter impacts directly on three areas: the ability to layer color planes over one another on the photoconductor surface, the color quality of projected images such as overhead transparencies, and the reflectance color quality of secondary colors where one color is printed over the top of another color, as observed in both reflectance and transmission modes.

If the pigment particles are of sufficient size, they may interfere with laser discharge of the photoconductor. This makes it increasingly difficult to print a second color over the first, from a process point of view. Secondly, once the color is printed, the quality of that color is impacted if the top layer is scattering the incident light. Therefore, far more of the bottom color, or conversely far less of the top color will have to be printed to compensate for the scattered light. This requires complex printing algorithms to correct for the amount of each colorant deposited, and may require this amount to vary depending on whether a primary or a secondary color is to be printed. This scatter is hue dependent, and that means it is not quantitatively the same for the three primaries. Thus, algorithms to correct for it must be individualized for the three primaries. This adds a level of complexity to the firmware required to operate the printer. Furthermore, the quality of projected transparencies can never be as good as if the colorant particle dimensions were well below the wavelength of visible light.

There is a semantic problem with the definition of dyes and pigments, as they are defined by their solubility in the liquid medium. The terminology derives from antiquity when most dyeing was done in aqueous media. A "dye" is soluble (generally speaking of aqueous solutions) and a "pigment" is not soluble. What is a "dye" in one solvent system may become a "pigment" when the solvent is changed. Many toner fabricators have simply overlooked dyes in their search for new colorants, without recognizing that many "dyes" would behave as "pigments" in the nonaqueous environment of the EP toner.

One objection in the past to using dyes in toners is the erroneous perception that dyes lack sufficient lightfastness or tinctorial strength to be used in printer applications. This objection is easily addressed by a survey of lightfast dyes. Many dyes exist which have excellent lightfastness, and some are even used in the standard comparative lightfastness tests such as DIN 54 003 and DIN 54 004.

The prior art teaches two methods of preparing liquid EP toners, both of which are based on relatively large pigment particles. One traditional method is to melt the polymeric resin and blend finely ground pigment into the melt. The blend is cooled to allow it to solidify, and then pulverized to a fine powder. The powder is subsequently dispersed in a non-conducting non-polar liquid such as a petroleum distillate. The second method is to prepare a hydrocarbon (or other solvent) dispersion of the polymeric resin and blend the finely ground pigment into the dispersion. During the blending process, the polymeric resin comes into contact with the pigment particle and forms an attachment to the pigment via Van der Waals forces, dipole-dipole interactions or even covalent bonding. These fabrication methods involve many steps, and do not lend themselves well to fully automated assembly line processes. Furthermore, both methods begin with a pigment particle in the size range of 0.05 $\mu$m to 2/$\mu$m or even greater, and build up a resin coating on that. The final particle size can be 0.2 to 70 $\mu$m or even greater, so these EP toners tend to flocculate and eventually settle. Also, particles in this size range possess the above-described, disadvantageous property of light scattering.

Most attempts to eliminate the scatter due to relatively large particle size have involved one or both of two possible approaches. The resin-coated pigment particle can be reduced in size, or the pigment itself can be ground very fine prior to binding the resin to it, and then the thermoplastic resin coating can be fused at any of several points in the EP process to produce an amorphous phase in which the pigment is dispersed. With either approach, simply milling or grinding the pigment or dye chosen to a finer particle size will help. There are disadvantages to simply milling or grinding to a finer particle size in both dry powder and liquid systems, including increased cost of the raw materials, as finely ground pigments and soluble dyes are invariably more expensive than the coarser size particle of the same substance.

In dry powder electrophotographic systems, the toner is triboelectrically charged, and attracted through air via electrostatics to the photoconductor surface where the image is formed. There are fundamental limitations on how small these particles can be and still maintain control of their location in space. If the particles are below about 5 $\mu$m, they become difficult to control via electrostatics alone. The result may be increased background scatter and decreased homogeneity of solid fill areas in the printed image. An additional disadvantage of these very small-sized particles is the associated health and environmental concerns. Any dust, however chemically inert, that falls in this size range, is small enough to pass by the nasal hairs and mucosa and enter the lungs, yet not small enough to be simply exhaled again. That means particles of this size must absolutely be contained within the printer, for regulatory and ethical reasons, and this again complicates the printer design, and increases its cost.

One solution to this difficulty is to contain the preferred smaller particles in a liquid dispersant, and a number of liquid toner systems have been reported. All of them employ steric and/or electrostatic means to stabilize the relatively large dispersed particle in a non-polar, non-conducting medium such as petroleum distillate. The liquid toners reported to date have been dispersions of particles on the order of 0.1 $\mu$m to 50 $\mu$m in diameter. The disadvantage of these dispersions is that they are often difficult to stabilize, particularly at the high end of this diameter range where gravity exerts enough force to overcome the tendency of the particles to repel each other, and thus promotes settling. Some toners are composed of finely ground pigment particles with very little resin binder attached. In these toners, the particle size may be very small, but they lack the steric stabilization afforded by adding a polymeric resin. The resin provides the steric stabilization but necessarily increases particle size.

In all these approaches, the fundamental size of the ground pigment itself causes light scatter, and can disrupt the laser beam making overprinting of one color on another difficult or impossible. To solve the problem of nontransparent color planes, various print methods are used. One way is to lay the primary color planes down one at a time on the photoconductor, and to remove them to an intermediate holding material until they can all be transferred to paper, which is indirect transfer. Indirect transfer requires additional mechanical and electronic systems, increasing cost and complexity of the printer. Each transfer step increases the probability that errors in alignment or registration may occur. Direct transfer of the color planes one at a time to the paper, or other final receiving medium, is conceptually simpler, but requires the paper or other medium to be manipulated back and forth through the developer several times, and is prone to errors and difficulties, including saturation of the paper with the dispersing medium of the toner.

Print algorithms have been employed to accomplish more simply with software what is cumbersome and difficult using hardware. One way to get around the problem of non-transparent toners while developing all four color planes on the photoconductor at the same time is to lay primary colors side by side. This eliminates the need for multiple passes of the paper or intermediate transfer material, improves color-to-color registration, and works by allowing the human eye to integrate the primaries in order to perceive the desired secondary and tertiary colors. However, there is a finite number of colors which can be produced in this way, and if there is imperfect color-to-color registration, the number of colors is reduced even further. An additional and significant disadvantage is that the effective resolution of the printer is reduced. With only 2×2 pixelling arrangements, which is the minimum size, a 600×600 dpi printer is reduced to a resolution of 300×300, and without gray scaling capability only about 300 colors can be made. Regardless of what is done to improve color on paper, there remains in any case the problem of overhead transparencies that are printed with pigments that are large enough to scatter visible light and therefore are not quite transparent. Colors projected look dark and muddy, not bright and clear. The effect may be especially objectionable in the case of yellow, which appears brown or blotchy when the particle size is large enough to scatter.

A further problem with the relatively large particle size is that the print quality is degraded, in terms of resolution, edge roughness, edge sharpness, and background scatter. Scatter, when it occurs, is far more noticeable and objectionable on the printed page because individual particles are often large enough to be visible with the unaided human eye. Smaller particles, unresolved individually, contribute to a grey or pastel background.

Larger particles also have lower mobility in the dispersing medium. For the same density of charge bearing locations within a particle, surface charge-to-mass decreases as the particle diameter increases. At the same time mobility is decreasing, due to drag forces. The net effect is a much slower migration of the charged particles toward the photoconductor. In practical terms this means either lower print density on the paper or longer developer residence times, slower print times and fewer pages per minute.

Fusing or melting the polymeric resin in which the pigment is embedded, after developing the image, is almost universally employed in order to convert the discrete toner particles into an amorphous film. This is not enough to overcome the effects of scatter when the size of the fundamental pigment particles, embedded in the amorphous film, is on the order of magnitude of the visible light. Smaller particles are needed, but are not easily obtained or stabilized in dispersion using the current technology.

It is therefore an object of the present invention to provide a single macromolecule that consolidates all of the functions served by the toner particle.

A second object of this invention is to provide a smaller sized toner particle that allows faster print speeds due to reduced drag, and a possibility of greater charge to mass ratio (q/m) and greater electrophoretic mobility.

It is an additional objective of this invention to provide a smaller sized toner particle to reduce or overcome the effects of scatter of light in the visible range.

A further objective of this invention is to provide a smaller sized toner particle to allow superior print quality, not limited by the toner particle dimension.

It is a further objective of this invention to provide a liquid toner that forms more stable dispersions, and possesses a longer shelf and storage life.

SUMMARY OF THE INVENTION

Figure 1:
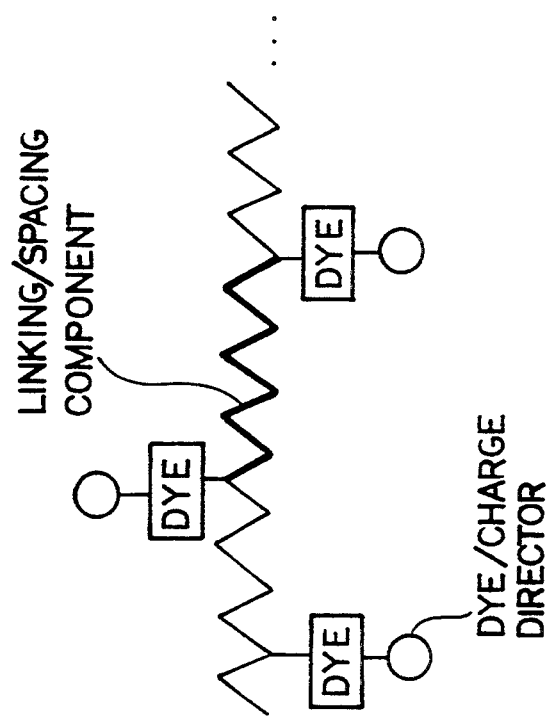
FIG. 1 is a schematic representation which illustrates a method for making a first embodiment of the dye-polymer toner macromolecule of this invention.
Figure 1:
Figure 1:
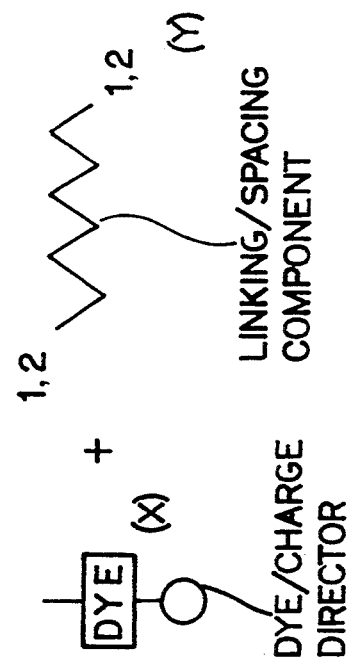

This invention consolidates all of the functions served by the EP toner in one macromolecule. The invention is a macromolecule of dye-polymer comprising a dye colorant copolymerized with a linking/spacing component, using well known principles of polymer chemistry. A dye/charge director component may be. copolymerized with the dye colorant and the linking/spacing component simultaneously or subsequently, or it may be an intrinsic part of the dye colorant or the linking/spacing component. The resulting dye-polymer macromolecule may be dissolved or dispersed in a liquid toner for electrophotographic development.

DETAILED DESCRIPTION OF THE INVENTION

The dye colorant or chromophore, in principle, is any dye or pigment listed in the *Colour Index*, Vols. I and II, or in any of the updated volumes. Preferred dye colorants are those crown ether styryl dyes available through the H.W. Sands (HWS) Corp. of Hauppauge, New York. Especially preferred are those HWS R & D Screening Catalog (Rev. 8/92) #s AGF-26, AGF-40, AGF-41, LF-24, LF-43, LF-44, LF-83, LF-89 and LF-93. The dye colorant of this invention is called a 'monomer' because it is not a polymer in the usual sense wherein a polymer is the combination of a number of repeating structural units. The dye colorant of this invention is instead a single molecule from the *Colour Index* without repeating structural units.

The linking/spacing component is itself an oligo or short polymer, including short random or block copolymers. By "short" is meant 4-50 monomer structural units making up the oligo or short polymer. This way, depending on the molar absorptivity of the dye colorant, the mole ratio of the monomer structural units making up the short polymer compared to the dye colorant is 4-50. One purpose of the linking/spacing component is to make a polymer chain in the size range of approximately 0.005-0.1 $\mu$m. This is the linking/spacing component's linking function, which results in a macromolecule large enough to agglomerate into an image. Another purpose of the linking/spacing component is to provide sites on the resulting polymer chain for binding with the dye/charge director component. This is the linking/spacing component's spacing function, which results in a macromolecule with well dispersed dye colorant and dye/charge director moieties along its polymer chain. The colorant or chromophore contains or is modified to contain a functional group which permits it to copolymerize with the linking/spacing component and become part of the resulting polymer chain. Examples of such polymerizable functional groups include vinyl groups, styrene groups, acrylate groups and substituted forms of each of these. These polymerizable functional groups are depicted as linking sites (1) in the Figures below. Functional groups for attaching the dye colorant and the dye/charge director component to the macromolecule polymer chain are depicted as spacing sites (2) in the Figures.

The linking/spacing component may be selected from acrylates, substituted acrylates, alkenes and substituted alkenes, arenes and substituted arenes, and combinations thereof.

The dye/charge director component may be a charge directing site that is an intrinsic part of the dye colorant monomer or the linking/spacing component. The charge directing site is preferably, but does not have to be, a chelating macrocycle. Or, the charge directing site may be any other commonly used coordinating, acid-base or electrostatically interacting functional group. Examples of such dye/charge director components with such directing sites include, for example, potassium laurate, potassium hexadecanoate and zirconium nexadecanoate. The dye/charge director component may be available as a constituent of the dye colorant monomer, or as a constituent of the linking/spacing component. Also, the dye charge director component may be added as a separate constituent before or after the dye polymer macromolecule is formed.

The liquid toner medium used in conjunction with the dye-polymer of this invention is a low dielectric, low- or non-conducting liquid. Examples of such liquid include isoparaffinic hydrocarbons, silicon oils, or fluorinated hydrocarbons. Preferred embodiments include any of the Isopars TM or Norpars TM manufactured by Exxon Co. The dye polymer toner particle of this invention is made from components chosen to have solubility parameters which are compatible with the liquid toner medium.

According to a preferred method for making the dye-polymer toner of the present invention, the dye colorant monomer is dissolved in a polymerization solvent. The dye colorant is preferably soluble in the polymerization solvent to ensure that it reacts as a molecular species rather than associating in large aggregates. The dye colorant's solubility in the liquid toner medium is not necessary since the linking/spacing component will stabilize its dispersion throughout the toner medium. Preferably, the toner medium is used as the polymerization solvent.

Then, the linking/spacing component and promoters, if desired, are introduced while stirring or heating to the polymerization solvent, as required by the polymerization reaction. If the polymerization is taking place in a solvent other than the one chosen for the EP toner, it may be necessary to desolvate after the polymerization reaction is at equilibrium. If a solid results from the desolvation step it may be necessary grind the residue. The residue from the previous step is then dispersed in the desired EP liquid dispersant, using mechanical or other agitation. If the dye/charge director component is not already an intrinsic part of the polymerization product after the dispersion step, it may be conveniently added to the EP toner at this time.

A first advantage of this invention is faster print speeds due to reduced drag. Smaller particles have greater mobility in the dispersion due to reduced drag. The desired print density can then be achieved in less time. Alternatively, these toners can print to the same density at lower fields, if the same amount of time is allowed.

A second advantage is that a greater charge to mass ratio (q/m) is theoretically possible. For a given density of charged sites in a toner particle, smaller particles have greater surface area to volume ratios. This means surface charge is increased and effective q/m increases. Mobility (zeta potential) is also increased. Greater effective q/m results in higher particle mobilities and the effects discussed above, for faster particle velocities. Greater control of particle adsorption and charge exchange is also possible.

A further advantage is improved performance with respect to light scatter. These toner particles are macromolecules with dimensions less than or equal to 0.1 pm, much smaller than the wavelengths of visible light. This means that scatter will not be a problem. Transparency quality will be improved, and color planes overlaid will not interfere with each other. Color quality will be improved.

A further advantage of this invention is improved theoretical performance with respect to print quality. The smaller particles will be individually invisible to the human eye and will not degrade background, edge roughness, edge sharpness or solid fill homogeneity. Print quality will thus be limited by the laser optics, engine noise and paper handling, and not the toner particle dimensions.

A further advantage of this invention is the creation of more stable dispersions and therefore a longer shelf and storage life. The smaller particles will be less likely to flocculate and settle. Also, if the solubility parameters are well matched, the toner may be a true solution in which case settling could be prevented altogether. It is the dependence on larger pigment particles that requires other toners fabricated using prior art techniques to be dispersions rather than solutions.

The following EXAMPLES will help to clarify the present invention. EXAMPLES:

Preferred Embodiment 1

A dye-polymer toner particle with the dye/charge directing component as a part of the dye monomer.

A polymer is prepared using well known polymerization methods as depicted schematically in FIG. 1, such as free radical polymerization, and using the following weight ratios of any one or a combination of the indicated materials.

| Wt. % | Monomer | Solubility parameter |
|---|---|---|
| 60–90 | lauryl methacrylate | 8.20 |
| | lauryl acrylate | 8.30 |
| | 2-ethylhexylmethacrylate | 8.40 |
| | 2-ethylhexylacrylate | 8.50 |
| | n-hexylmethacrylate | 8.60 |
| | n-hexylacrylate | 8.65 |
| | t-butylmethacrylate | 8.65 |
| | n-butylmethacrylate | 8.75 |
| | s-butylmethacrylate | 8.80 |
| | t-butylacrylate | 8.90 |
| 5–40 | Acrylate derivatized crown ether styryl dye, such as: AGF-26, AGF-40, AGF-41, LF-24, LF-43, LF-44, LF-83, LF-83, LF-89 and LF-93 which are available from the H.W. Sands R & D/Screening Catalog (Rev 8/92) any acrylate derivatized phthalocyanine, porphine or other meso-or macrocyclic chelating chromophore | |
| 0–2 | Norpar TM soluble metal soap e.g. Zirconium hexanoate | |

Formulation 1

79 wt % n-hexyl methacrylate and 20 wt. % acrylate derivatized AGF-26 are copolymerized in a suitable solvent, and the resulting copolymer is a suspended in Norpar TM 12. 1 wt. % potassium laurate is added to the toner solids as a charging agent.

Formulation 2

A mixture of 45 wt. % n-hexylacrylate and 34 wt. % n-hexylmethacrylate are copolymerized with 20 wt % n-hexylacrylate derivatized dye LF-43. The copolymer is suspended in Norpar TM 12 and 1 wt % zirconium hexadecanoate is added to the toner solids as a charging agent.

Preferred Embodiment 2

A dye-polymer toner with dye/charge directing comoanent senorate from dye monomer.

Figure 2:
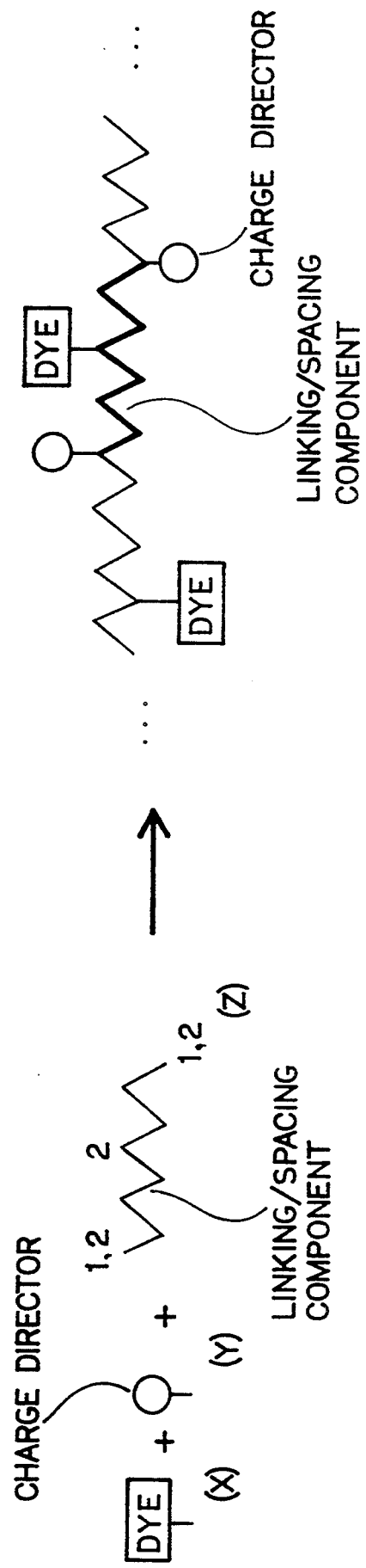
FIG. 2 is a schematic representation which illustrates a method for making a second embodiment of the dye-polymer toner macromolecule of this invention.

A polymer is prepared using well known polymerization methods as depicted schematically in FIG. 2, such as free radical polymerization, and using the following weight ratios of any one or a combination of the indicated materials.

| Wt. % | Monomer | Solubility parameter |
|---|---|---|
| 40–90 | lauryl methacrylate | 8.20 |
| | lauryl acrylate | 8.30 |
| | 2-ethylhexylmethacrylate | 8.40 |
| | 2-ethylhexylacrylate | 8.50 |
| | n-hexylmethacrylate | 8.60 |
| | n-hexylacrylate | 8.65 |
| | t-butylmethacrylate | 8.65 |
| | n-butylmethacrylate | 8.75 |
| | s-butylmethacrylate | 8.80 |

-continued

| Wt. % | Monomer | Solubility parameter |
|---|---|---|
| | t-butylacrylate | 8.90 |
| 0–20 | acrylate derivatized drown ether or substituted crown ether | |
| 5–60 | acrylate derivatized dye or pigment such as: phthalocyanines Disperse Yellow, Reds, Violets, etc., such as Disperse Yellow 4 Vat Yellow, Reds, Violets, Greens, etc. | |
| 0–2 | Norpar ™ soluble metal soap e.g., Zirconium hexadecanoate | |

Formulation 3

70 wt. % n-hexylacrylate is copolymerized with 9.5 wt. % acrylate derivatized 18-crown-6 ether and 20 wt. % acrylate derivatized Disperse Yellow 4. The copolymer is dispersed in Norpar ™ 12, and 0.5% (based on weight of solids) potassium hexadecanoate is added as charge directing agent.

When formulations 1-3 are used as the toner medium in EP systems an appropriate image is obtained.

While there is shown and described the present preferred embodiments of the invention, it is to be distinctly understood that this invention is not limited thereto but may be variously embodied to practice within the scope of the following claims.

What is claimed is:

1. A covalently-bonded macromolecule of dye-polymer toner particle which is 0.1 μm or smaller in size.

2. A macromolecule of dye-polymer toner particle consisting of:
   a dye-colorant monomer,
   a linking/spacing component, and
   a dye/charge director component containing a charge directing site,
   said dye colorant monomer, linking/spacing component and dye/charge director component each being bound in the dye-polymer macromolecule by covalent bonding, and the macromolecule particle being 0.1 μm or smaller in size.

3. The macromolecule of claim 2 wherein the dye/charge director component is a constituent of the dye-colorant monomer.

4. The macromolecule of claim 2 wherein the dye/charge director component is a constituent of the linking/spacing component.

5. The macromolecule of claim 2 wherein the charge directing site of the dye/charge director component is a chelating macrocycle.

6. The macromolecule of claim 2 wherein the charge directing site of the dye/charge director component is any commonly used coordinating, acid-base or electrostatically interacting functional group.

7. The macromolecule of claim 2 wherein the dye-colorant monomer is selected from the group consisting of any dye or pigment listed in the *Colour Index*, vols. I and II, or in any of the updated volumes.

8. The macromolecule of claim 7 wherein the dye-colorant monomer contains or is modified to contain a functional group which permits it to copolymerize with other constituents of the dye-polymer macromolecule and become part of a polymer chain.

9. The macromolecule of claim 8 wherein the polymerizable functional group is selected from the group consisting of vinyl groups, styrene groups, acrylate groups and substituted forms of each of these groups.

10. The macromolecule of claim 2 wherein the linking/spacing component is selected from the group consisting of acrylates, substituted acrylates, alkenes and substituted alkenes, arenes and substituted arenes.

11. The method of making a covalently-bonded macromolecule of dye-polymer toner particle consisting of:
    dissolving a dye-colorant monomer in a polymerization solvent;
    introducing a linking/spacing component into the solvent; and,
    subjecting the resulting mixture to polymerization conditions so that the macromolecule particle is 0.1 μm or smaller in size.

12. The method of claim 11 wherein a dye-charge director component is a constituent of the dye-colorant monomer.

* * * * *